(12) United States Patent
Takaoka

(10) Patent No.: US 10,132,351 B2
(45) Date of Patent: Nov. 20, 2018

(54) SQUEEZE FILM DAMPER BEARING DEVICE

(71) Applicant: HONDA MOTOR CO., LTD., Tokyo (JP)

(72) Inventor: Keisuke Takaoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/898,927

(22) Filed: Feb. 19, 2018

(65) Prior Publication Data

US 2018/0245630 A1      Aug. 30, 2018

(30) Foreign Application Priority Data

Feb. 24, 2017   (JP) .................. 2017-033474

(51) Int. Cl.
*F16C 27/04* (2006.01)
*F16C 19/06* (2006.01)

(52) U.S. Cl.
CPC ............ *F16C 27/045* (2013.01); *F16C 19/06* (2013.01); *F16C 2360/23* (2013.01)

(58) Field of Classification Search
CPC .... F16C 19/06; F16C 27/045; F16C 2360/23; F16F 15/0237
See application file for complete search history.

(56) References Cited

U.S. PATENT DOCUMENTS

| | | | | |
|---|---|---|---|---|
| 3,784,267 A | * | 1/1974 | Davis .................... | F16C 27/045 384/453 |
| 4,527,912 A | * | 7/1985 | Klusman ............... | F01D 25/164 384/99 |
| 5,711,615 A | * | 1/1998 | Stitz ...................... | F16C 27/045 384/471 |
| 6,695,478 B2 | * | 2/2004 | Bos ....................... | F01D 25/164 384/99 |
| 9,951,817 B2 | * | 4/2018 | Meyers ................. | F01D 25/164 |

FOREIGN PATENT DOCUMENTS

JP        2003-083325        3/2003

* cited by examiner

*Primary Examiner* — Phillip A Johnson
(74) *Attorney, Agent, or Firm* — Rankin, Hill & Clark LLP

(57) ABSTRACT

A squeeze film damper bearing device includes an annular space that is defined between an outer periphery of an outer race, an inner periphery of a bearing retaining member, and a pair of seal rings and forms a squeeze film, and an annular adjustment groove that is formed in the inner periphery of the bearing retaining member that is sandwiched by the pair of seal rings. A depth in a radial direction of the adjustment groove gradually decreases down to zero from a middle side in an axial direction of the adjustment groove in going toward at least one end side in the axial direction.

1 Claim, 5 Drawing Sheets

FIG.3C EMBODIMENT

FIG.3A COMPARATIVE EXAMPLE

SQUEEZE FILM DAMPER BEARING DEVICE

CROSS REFERENCE TO RELATED APPLICATIONS

The present application claims priority under 35 U.S.C. § 119 to Japanese Patent Application No. 2017-33474 filed Feb. 24, 2017 the entire contents of which are hereby incorporated by reference.

BACKGROUND OF THE INVENTION

Field of the Invention

The present invention relates to a squeeze film damper bearing device comprising an inner race that is fitted around an outer periphery of a rotating shaft, an outer race that is supported on an inner periphery of a bearing retaining member, a plurality of rolling bodies that are disposed between the inner race and the outer race, a pair of seal rings that are provided on opposite end parts in an axial direction of an outer periphery of the outer race and resiliently abut against the inner periphery of the bearing retaining member, an annular space that is defined between the outer periphery of the outer race, the inner periphery of the bearing retaining member, and the pair of seal rings and forms a squeeze film, and an annular adjustment groove that is formed in the inner periphery of the bearing retaining member that is sandwiched by the pair of seal rings.

Description of the Related Art

A squeeze film damper bearing device for damping vibration of a rotating shaft, which rotates at high speed, of a gas turbine engine, etc., is known from, for example, Japanese Patent Application Laid-open No. 2003-83325.

It is known that the vibration attenuating performance of such a squeeze film damper bearing device greatly depends on the land width of a squeeze film. The land width of a squeeze film is the width in the axial direction of a land portion in which the inner periphery of a bearing retaining member, which is a fixed wall, opposes the outer periphery of an outer race of a bearing, which is a movable wall, via a small gap forming a squeeze film in an annular space sandwiched between the outer periphery of the outer race and the inner periphery of the bearing retaining member.

In order to adjust the land width, an annular adjustment groove is formed in the inner periphery of the bearing retaining member; increasing the width in the axial direction of the adjustment groove enables the land width to be decreased, and decreasing the width in the axial direction of the adjustment groove enables the land width to be increased.

A pair of seal rings are fitted around the outer periphery of the outer race, the seal rings abutting against the inner periphery of the bearing retaining member so as to define an annular space. Because of this, when the outer race having the seal rings fitted in advance is assembled into the inner periphery of the bearing retaining member or when it is detached from the inner periphery of the bearing retaining member, the seal rings, which attempt to expand radially outward due to self resilience, catch on an end part in the axial direction of the adjustment groove, and there is the problem that assembling and detaching the outer race becomes difficult.

SUMMARY OF THE INVENTION

The present invention has been accomplished in light of the above circumstances, and it is an object thereof to provide a squeeze film damper bearing device in which the ease of assembly of an outer race having a seal ring into a bearing retaining member is enhanced.

In order to achieve the object, according to a first aspect of the present invention, there is provided a squeeze film damper bearing device having an inner race that is fitted around an outer periphery of a rotating shaft, an outer race that is supported on an inner periphery of a bearing retaining member, a plurality of rolling bodies that are disposed between the inner race and the outer race, a pair of seal rings that are provided on opposite end parts in an axial direction of an outer periphery of the outer race and resiliently abut against the inner periphery of the bearing retaining member, an annular space that is defined between the outer periphery of the outer race, the inner periphery of the bearing retaining member, and the pair of seal rings and forms a squeeze film, and an annular adjustment groove that is formed in the inner periphery of the bearing retaining member that is sandwiched by the pair of seal rings, wherein a depth in a radial direction of the adjustment groove gradually decreases down to zero from a middle side in the axial direction of the adjustment groove in going toward at least one end side in the axial direction.

In accordance with the first aspect, since the squeeze film damper bearing device includes the inner race fitted around the outer periphery of the rotating shaft, the outer race supported on the inner periphery of the bearing retaining member, the plurality of rolling bodies disposed between the inner race and the outer race, the pair of seal rings provided on the opposite end parts in the axial direction of the outer periphery of the outer race and resiliently abutting against the inner periphery of the bearing retaining member, the annular space defined between the outer periphery of the outer race, the inner periphery of the bearing retaining member, and the pair of seal rings and forming a squeeze film, and then annular adjustment groove formed in the inner periphery of the bearing retaining member sandwiched by the pair of seal rings, when the outer race is displaced with respect to the inner periphery of the bearing retaining member in response to vibration of the rotating shaft, the squeeze film formed in the annular space sandwiched between the inner periphery of the bearing retaining member and the outer periphery of the outer race, resists movement of the outer race, thereby enabling the vibration of the rotating shaft to be damped and, moreover, it is possible, by adjusting the land width of the bearing retaining member by the adjustment groove, to adjust the attenuating performance of the squeeze film.

Furthermore, since the depth in the radial direction of the adjustment groove gradually decreases down to zero from a middle side in the axial direction of the adjustment groove in going toward at least one end side in the axial direction, when the outer race having the seal ring on the outer periphery is assembled into or detached from the inner periphery of the bearing retaining member, it is possible to prevent the seal ring from catching on an end part in the axial direction of the adjustment groove, thus enhancing the workability.

Note that a low pressure system shaft 15 and a sleeve 41 of embodiments correspond to the rotating shaft of the present invention, and balls 47 of the embodiments correspond to the rolling bodies of the present invention.

BRIEF DESCRIPTION OF THE DRAWINGS

The above and other objects, characteristics and advantages of the present invention will be clear from detailed descriptions of the preferred embodiments which will be provided below while referring to the attached drawings.

FIGS. 3A to 3D are diagrams for explaining the operation when an outer race is assembled and detached. (first embodiment)

DESCRIPTION OF THE PREFERRED EMBODIMENTS

First Embodiment

A first embodiment of the present invention is explained below with reference to FIGS. 1 to 3D.

Figure 1:
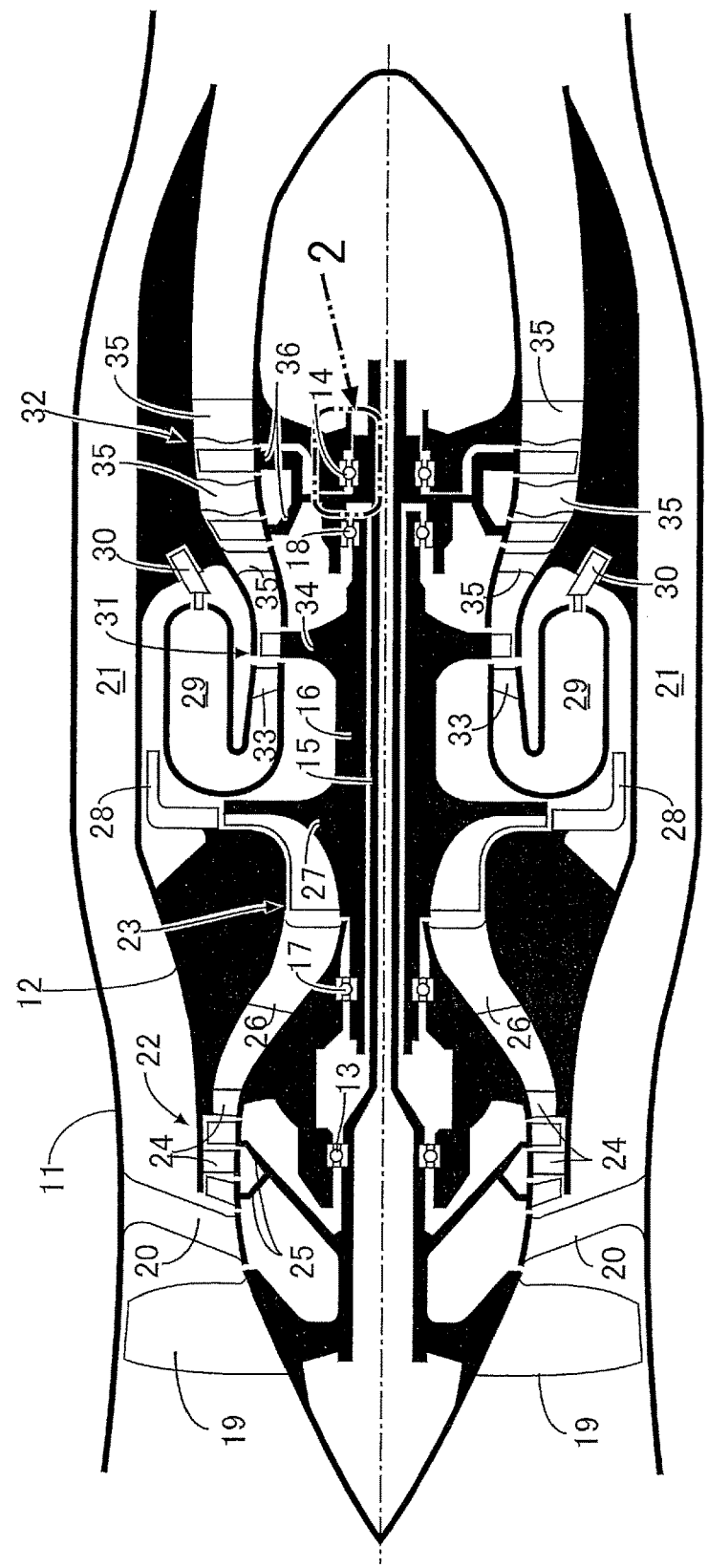
FIG. 1 is a diagram showing the overall structure of a gas turbine engine. (first embodiment)

As shown in FIG. 1, a gas turbine engine for an aircraft to which the present invention is applied includes an outer casing 11 and an inner casing 12, and a front part and a rear part of a low pressure system shaft 15 are rotatably supported in the interior of the inner casing 12 via a front first bearing 13 and a rear first bearing 14 respectively. A tubular high pressure system shaft 16 is relatively rotatably fitted around the outer periphery of an intermediate part in the axial direction of the low pressure system shaft 15, a front part of the high pressure system shaft 16 is rotatably supported on the inner casing 12 via a front second bearing 17, and a rear part of the high pressure system shaft 16 is relatively rotatably supported on the low pressure system shaft 15 via a rear second bearing 18.

A front fan 19 is fixed to the front end of the low pressure system shaft 15, blade ends of the front fan 19 facing an inner face of the outer casing 11. Part of the air drawn or sucked in by the front fan 19 passes through stator vanes 20 disposed between the outer casing 11 and the inner casing 12, part thereof then passes through an annular bypass duct 21 formed between the outer casing 11 and the inner casing 12 and is jetted rearward, and another part thereof is supplied to an axial type low pressure compressor 22 and a centrifugal type high pressure compressor 23 disposed in the interior of the inner casing 12.

The low pressure compressor 22 includes stator vanes 24 fixed to the interior of the inner casing 12 and a low pressure compressor wheel 25 equipped with compressor blades on the outer periphery and fixed to the low pressure system shaft 15. The high pressure compressor 23 includes stator vanes 26 fixed to the interior of the inner casing 12 and a high pressure compressor wheel 27 equipped with compressor blades on the outer periphery and fixed to the high pressure system shaft 16.

A reverse flow combustion chamber 29 is disposed to the rear of a diffuser 28 connected to the outer periphery of the high pressure compressor wheel 27, and fuel is injected into the interior of the reverse flow combustion chamber 29 from a fuel injection nozzle 30. Fuel and air are mixed in the interior of the reverse flow combustion chamber 29 and undergo combustion, and the combustion gas thus generated is supplied to a high pressure turbine 31 and a low pressure turbine 32.

The high pressure turbine 31 includes nozzle guide vanes 33 fixed to the interior of the inner casing 12 and a high pressure turbine wheel 34 equipped with turbine blades on the outer periphery and fixed to the high pressure system shaft 16. The low pressure turbine 32 includes nozzle guide vanes 35 fixed to the interior of the inner casing 12 and a low pressure turbine wheel 36 equipped with turbine blades on the outer periphery and fixed to the low pressure system shaft 15.

Therefore, when the high pressure system shaft 16 is driven with a starter motor (not shown), air that has been drawn or sucked in by the high pressure compressor wheel 27 is supplied to the reverse flow combustion chamber 29, mixed with fuel and undergoes combustion, and the combustion gas thus generated drives the high pressure turbine wheel 34 and the low pressure turbine wheel 36. As a result, the low pressure system shaft 15 and the high pressure system shaft 16 rotate, and the front fan 19, the low pressure compressor wheel 25, and the high pressure compressor wheel 27 compress air and supply it to the reverse flow combustion chamber 29, thus enabling the gas turbine engine to continue to run even when the starter motor is stopped.

While the gas turbine engine is running, part of the air drawn or sucked in by the front fan 19 passes through the bypass duct 21 and is jetted rearward thus generating the main thrust, particularly when flying at low speed. The remaining part of the air sucked in by the front fan 19 is supplied to the reverse flow combustion chamber 29, mixed with fuel, and undergoes combustion, and it drives the low pressure system shaft 15 and the high pressure system shaft 16 and is then jetted rearward, thus generating thrust.

Figure 2:
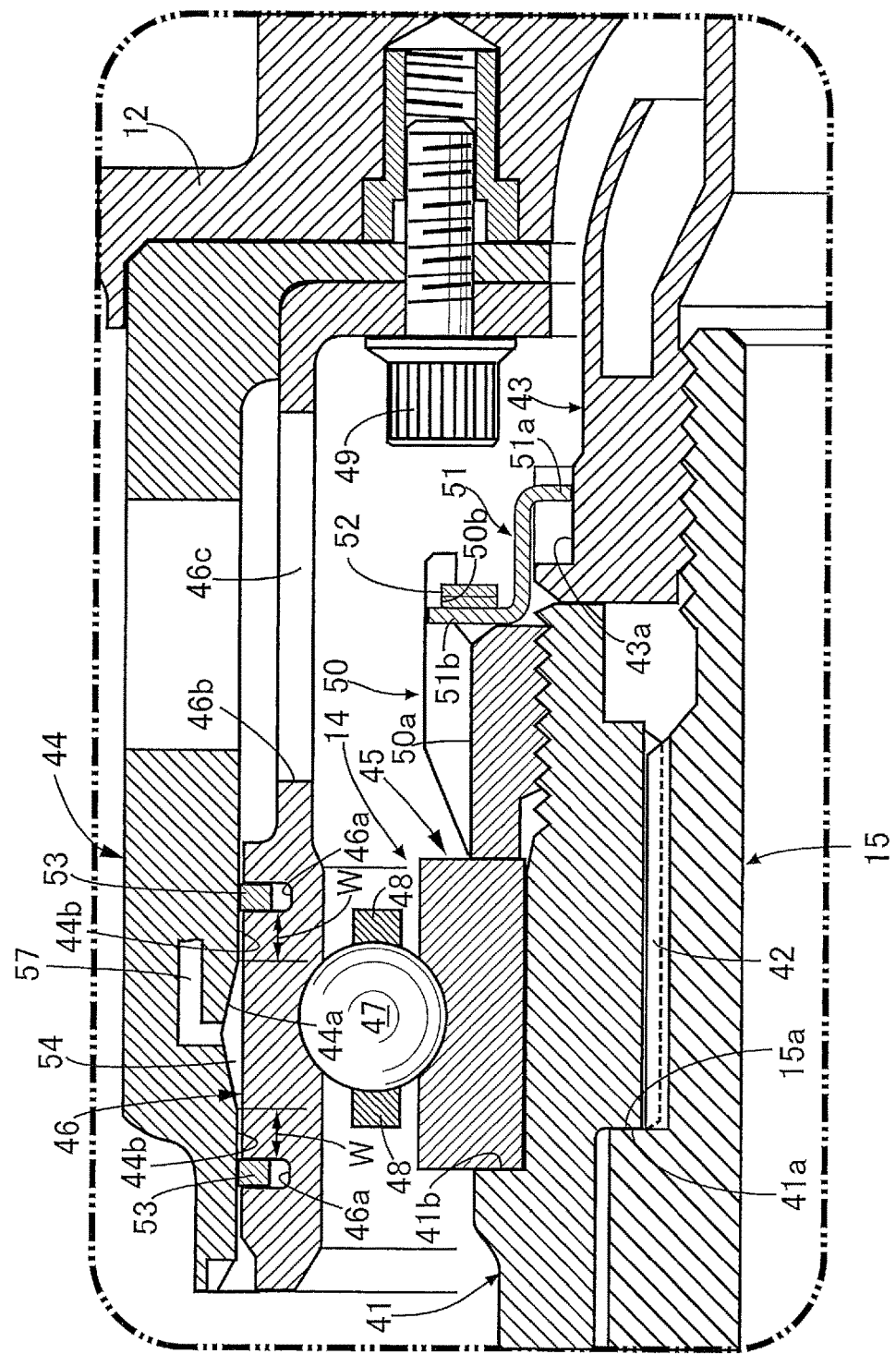
FIG. 2 is an enlarged view of part 2 in FIG. 1. (first embodiment)

The structure around the rear first bearing 14 is now explained with reference to FIG. 2.

A sleeve 41 for supporting the low pressure turbine wheel 36 is fitted around the outer periphery of the low pressure system shaft 15 by a spline fitting 42. The sleeve 41 is fastened to the low pressure system shaft 15 by screwing a first nut member 43 around the outer periphery of a shaft end of the low pressure system shaft 15 so as to push the sleeve 41 leftward in FIG. 2, thereby pressing a step portion 41a formed on the inner periphery of the sleeve 41 against a step portion 15a formed on the outer periphery of the low pressure system shaft 15.

The rear first bearing 14 includes an inner race 45 fitted around the outer periphery of the sleeve 41, an outer race 46 fitted into the inner periphery of a bearing retaining member 44 provided on the inner casing 12, a plurality of balls 47 disposed between the inner race 45 and the outer race 46, and a retainer 48 retaining the balls 47 at equal intervals in the peripheral direction. The bearing retaining member 44 and the outer race 46 are fastened to the inner casing 12 by bolts 49, and the inner race 45 is fastened by being urged leftward in FIG. 2 by a second nut member 50 screwed around the outer periphery of an end part of the sleeve 41, thereby being pressed against a step portion 41b formed on the outer periphery of the sleeve 41.

The outer race 46 includes a plurality of slit-shaped cutouts 46b extending in the axial direction and a plurality of rod-shaped spring portions 46c sandwiched between the plurality of cutouts 46b and extending in the axial direction, and a main body part of the outer race 46 retaining the balls 47 is therefore floatingly supported so as to be capable of moving relative to the inner casing 12.

The direction in which the first nut member 43 is screwed and the direction in which the second nut member 50 is screwed are set so as to be opposite to each other. That is, when the first nut member 43 is a right-hand screw, the second nut member 50 is a left-hand screw, and when the first nut member 43 is a left-hand screw, the second nut member 50 is a right-hand screw. A plurality of first groove portions 43a opening rightward in the axial direction in FIG. 2 are formed in the outer periphery of an end part of the first nut member 43 at equal intervals in the peripheral direction, and a plurality of second groove portions 50a opening rightward in the axial direction in FIG. 2 are formed in the outer periphery of the second nut member 50 at equal intervals in the peripheral direction.

An annular linking member 51 disposed between the first nut member 43 and the second nut member 50 includes two first projecting portions 51a that are disposed at intervals of 180° in the circumferential direction and can engage with the first groove portions 43a of the first nut member 43, and three second projecting portions 51b that are disposed at intervals of 120° in the circumferential direction and can engage with the second groove portions 50a of the second nut member 50.

A ring spring 52 that makes the linking member 51 latch with the second nut member 50 is one that is formed by winding a flat elastic metal plate with substantially two rotations into a ring shape, and an outer peripheral part thereof can engage with step portions 50b formed on the inner periphery of an end part of the second nut member 50.

Since the directions in which the first nut member 43 and the second nut member 50 are screwed are opposite to each other, if the first nut member 43 attempts to rotate in a direction in which it is loosened, the rotation acts on the second nut member 50 via the linking member 51 so as to tighten it, and it is thus possible to prevent both the first nut member 43 and the second nut member 50 from becoming loosened. Conversely, if the second nut member 50 attempts to rotate in a direction in which it is loosened, since the rotation acts on the first nut member 43 via the linking member 51 so as to tighten it, it is possible to simultaneously prevent both the first nut member 43 and the second nut member 50 from becoming loosened.

The rear first bearing 14 supporting the rear part of the low pressure system shaft 15 forms a squeeze film damper bearing, and seal rings 53 are fitted into a pair of seal ring grooves 46a formed in the outer periphery of the outer race 46 thereof. The seal rings 53 expand radially outward due to self resilience and resiliently abut against the inner periphery of the bearing retaining member 44, and an annular space 54 having a predetermined gap in the radial direction is defined between the outer periphery of the outer race 46, the inner periphery of the bearing retaining member 44, and the pair of seal rings 53.

Therefore, the outer race 46 can undergo relative movement within the range of the above gap in the radial direction relative to the bearing retaining member 44, and in this process the seal rings 53 undergo elastic deformation within the seal ring grooves 46a, thus maintaining a state of abutment against the inner periphery of the bearing retaining member 44. Oil sucked up by an oil pump (not shown) is supplied to the annular space 54 via an oil passage 57 formed in the interior of the bearing retaining member 44.

Furthermore, an annular adjustment groove 44a is formed in the inner periphery of the bearing retaining member 44 sandwiched between the pair of seal rings 53. The adjustment groove 44a has an isosceles triangular section; the depth in the radial direction is the largest for a middle part in the axial direction, which communicates with the oil passage 57, and the depth in the radial direction gradually decreases down to zero therefrom in going toward opposite sides in the axial direction. Of the inner periphery of the bearing retaining member 44, portions sandwiched by opposite ends in the axial direction of the adjustment groove 44a and the pair of seal rings 53 form land portions 44b of the squeeze film; when the groove width in the axial direction of the adjustment groove 44a increases a land width W decreases, and when the groove width in the axial direction of the adjustment groove 44a decreases the land width W increases.

The operation of the first embodiment of the present invention having the above arrangement is now explained.

When oil is supplied from the oil pump to the annular space 54 via the oil passage 57 of the bearing retaining member 44, a squeeze film is formed from a thin film of oil in the annular space 54. When the low pressure system shaft 15 vibrates in the radial direction while the gas turbine engine is running, the vibration is transmitted to the outer race 46 of the rear first bearing 14 having the inner race 45 supported on the sleeve 41 integrally fixed to the low pressure system shaft 15.

In this process, since vibration in the radial direction of the outer race 46 of the rear first bearing 14 is allowed due to the spring portions 46c undergoing elastic deformation, the size of the gap in the radial direction of the annular space 54 increases and decreases according to the vibration in the radial direction of the outer race 46, the outer race 46 is damped by a resistance force generated by flow and compression of viscous oil of the squeeze film within the annular space 54, and this enables the vibration of the low pressure system shaft 15 to be suppressed.

When the squeeze film exhibits a damping effect, oil that has absorbed vibrational energy generates heat and its temperature increases, but oil whose temperature has increased is discharged successively via abutment clearances of the seal rings 53 and fresh oil is supplied from the oil pump, thus maintaining the damping function of the squeeze film.

Since the oil film stiffness or oil film attenuation of the squeeze film depends on the land width W, it is possible, by adjusting the groove width in the axial direction of the adjustment groove 44a so as to change the land width W, to freely adjust the damping performance of the squeeze film.

FIGS. 3A to 3D explain the operation when the outer race 46 having the seal rings 53 fitted therearound in advance is assembled into or detached from the bearing retaining member 44.

Figure 3D:
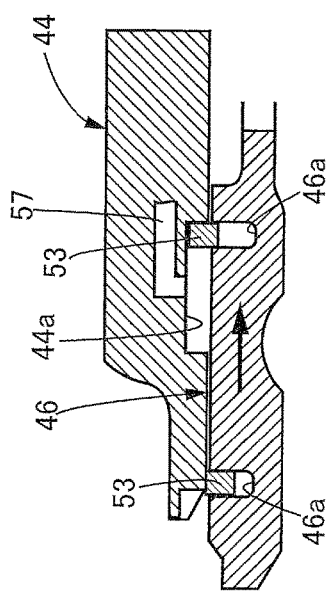
Figure 3D:
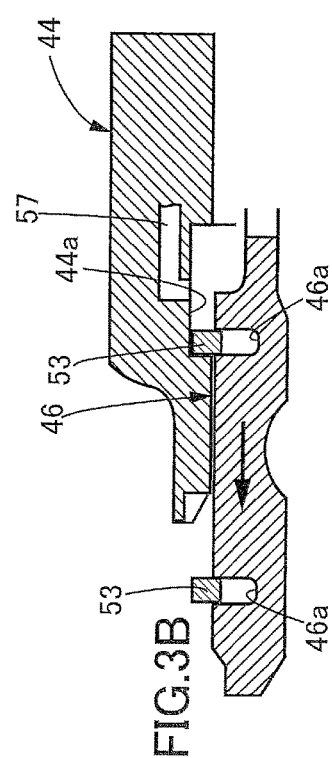
Figure 3B:
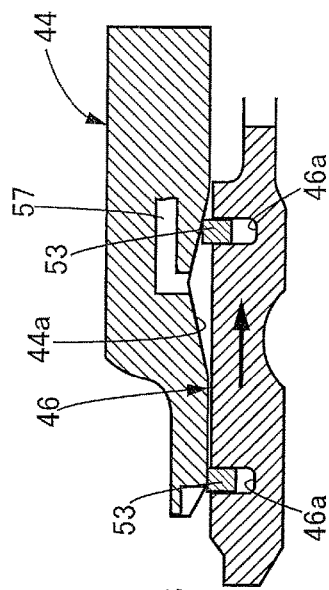
Figure 3B:
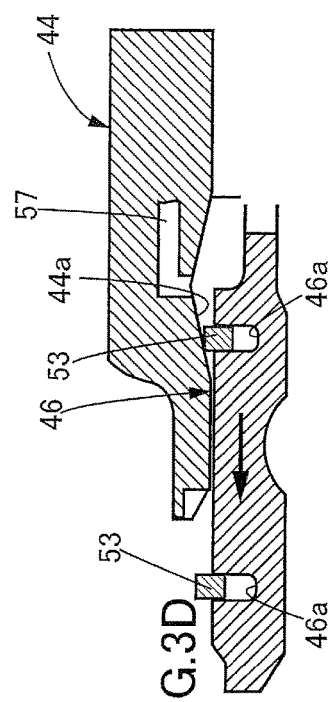

FIGS. 3A and 3B show a Comparative Example in which the section of the adjustment groove 44a has a rectangular shape; as shown in FIG. 3A, when the outer race 46 is moved rightward in the figure so as to assemble it into the inner periphery of the bearing retaining member 44, there is the problem that the seal ring 53 on the right-hand side catches on a corner part on the right-hand side of the adjustment groove 44a, and the outer race 46 cannot be inserted therebeyond. Furthermore, as shown in FIG. 3B, when the outer race 46 is moved leftward in the figures so as to detach it from the inner periphery of the bearing retaining member 44, there is the problem that the seal ring 53 on the right-hand side catches on a corner part on the left-hand side of the adjustment groove 44a, and the outer race 46 cannot be pulled out therebeyond.

FIGS. 3C and 3D show an embodiment in which the section of the adjustment groove 44a has a triangular shape;

as shown in FIG. 3C, when the outer race 46 is moved rightward in the figure so as to assemble it into the inner periphery of the bearing retaining member 44, the seal ring 53 on the right-hand side slips along an inclined face on the right-hand side of the adjustment groove 44a, thus preventing it from being caught and enabling the outer race 46 to be assembled without any problems, and the workability is improved. Furthermore, as shown in FIG. 3D, when the outer race 46 is moved leftward in the figure so as to detach it from the inner periphery of the bearing retaining member 44, the seal ring 53 on the right-hand side slips along an inclined face on the left-hand side of the adjustment groove 44a, thus preventing it from being caught and enabling the outer race 46 to be detached without any problems, and the workability is improved.

Even when the direction of assembling the outer race 46 and the direction of detaching it are opposite to those in the case of FIGS. 3A to 3D, since the section of the adjustment groove 44a is a triangular shape, it is possible to assemble or detach the outer race 46 without any problems.

Second Embodiment

Figure 4:
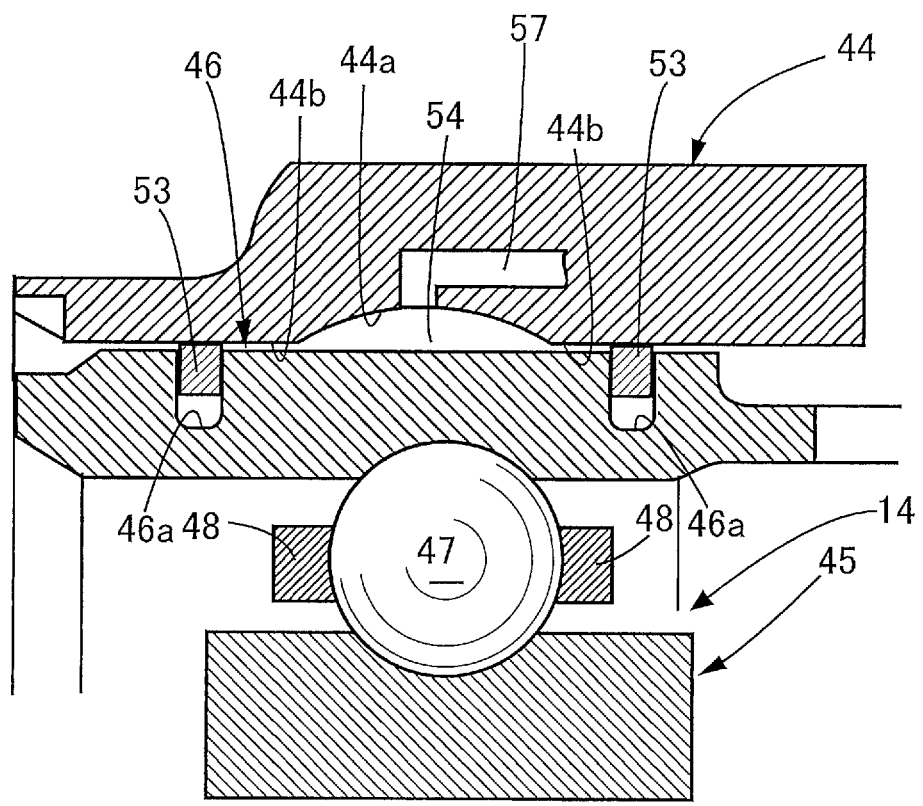
FIG. 4 is a view corresponding to an essential part of FIG. 2. (second embodiment)

FIG. 4 shows a second embodiment of the present invention; although the section of the adjustment groove 44a described above in the first embodiment is a triangular shape, the section of an adjustment groove 44a of the second embodiment is an arc shape. Even with this embodiment, since the depth in the radial direction of the adjustment groove 44a is the largest for a middle part in the axial direction and gradually decreases down to zero therefrom in going toward opposite sides in the axial direction, the same effects as those of the first embodiment can be achieved.

Third Embodiment

Figure 5:
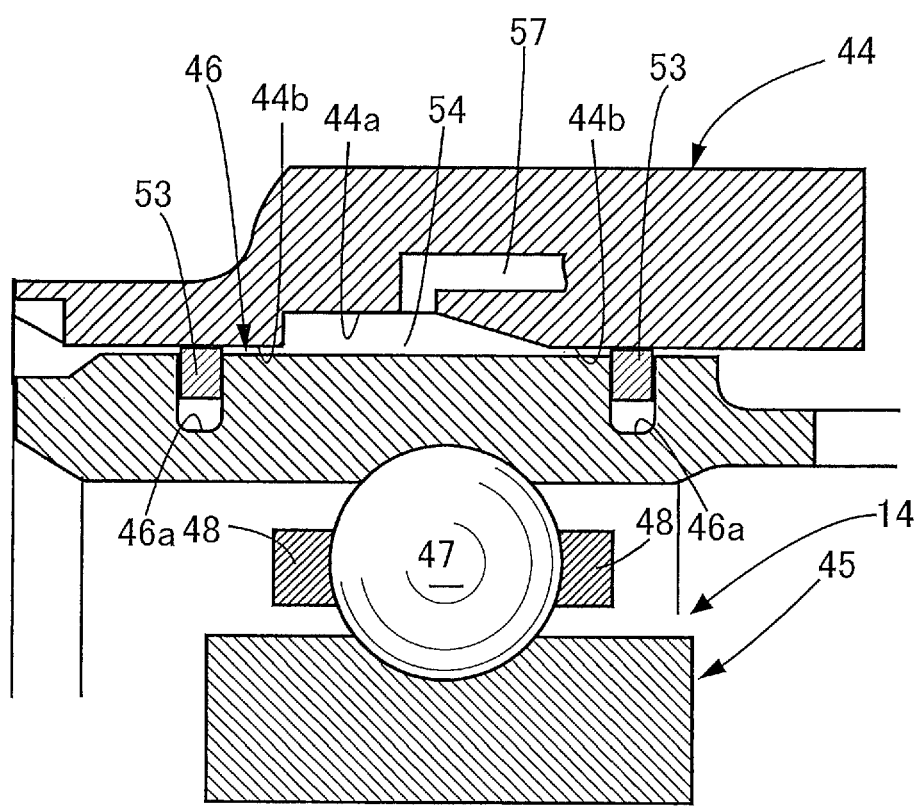
FIG. 5 is a view corresponding to the essential part of FIG. 2. (third embodiment)

FIG. 5 shows a third embodiment of the present invention; the section of an adjustment groove 44a is a trapezoidal shape, the depth in the radial direction gradually decreases down to zero in going toward one end side in the axial direction of the adjustment groove 44a, and a corner part is formed on the other end side in the axial direction of the adjustment groove 44a.

In this embodiment, when the outer race 46 is moved from the right-hand side to the left-hand side in the figure so as to assemble it or detach it, the seal ring 53 would catch on the corner part of the adjustment groove 44a, but if the outer race 46 is moved from the left-hand side to the right-hand side in the figure so as to assemble it or detach it, since the seal ring 53 slips on the inclined face of the adjustment groove 44a and is prevented from being caught, it is possible to assemble or detach the outer race 46 without any problems.

Embodiments of the present invention are explained above, but the present invention may be modified in a variety of ways as long as the modifications do not depart from the gist of the present invention.

For example, the subject to which the present invention is applied is not limited to the rear first bearing 14 of the gas turbine engine of the embodiments, and it may be applied to another bearing of a gas turbine engine, and it is also possible to apply it to a bearing of any application other than a gas turbine engine.

Furthermore, the rear first bearing 14 of the embodiments is a ball bearing, but it may be another type of bearing such as a roller bearing or a needle bearing.

What is claimed is:

1. A squeeze film damper bearing device comprising an inner race that is fitted around an outer periphery of a rotating shaft, an outer race that is supported on an inner periphery of a bearing retaining member, a plurality of rolling bodies that are disposed between the inner race and the outer race, a pair of seal rings that are provided on opposite end parts in an axial direction of an outer periphery of the outer race and resiliently abut against the inner periphery of the bearing retaining member, an annular space that is defined between the outer periphery of the outer race, the inner periphery of the bearing retaining member, and the pair of seal rings and forms a squeeze film, and an annular adjustment groove that is formed in the inner periphery of the bearing retaining member that is sandwiched by the pair of seal rings, wherein a depth in a radial direction of the adjustment groove gradually decreases down to zero from a middle side in the axial direction of the adjustment groove in going toward at least one end side in the axial direction.

* * * * *